May 31, 1932.  N. B. BRALY  1,861,296
HOSE COUPLING
Filed June 11, 1930  2 Sheets-Sheet 1

Inventor,
Norman B. Braly.
By
Attorney

May 31, 1932.  N. B. BRALY  1,861,296
HOSE COUPLING
Filed June 11, 1930  2 Sheets-Sheet 2
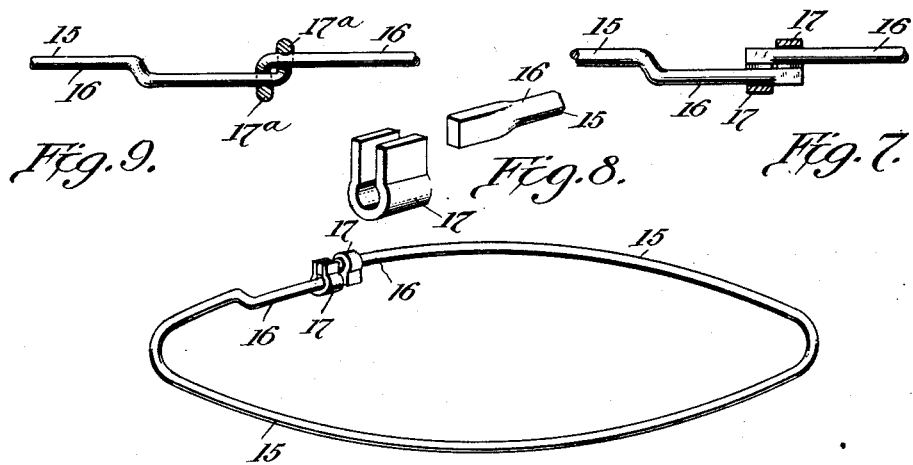
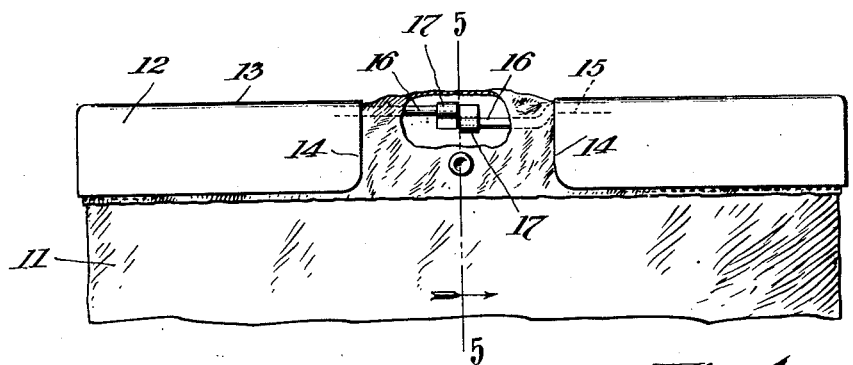
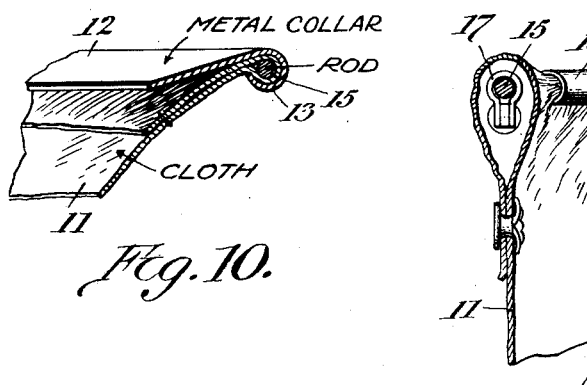
Inventor,
Norman B. Braly.
By
Attorney Patented May 31, 1932

1,861,296

UNITED STATES PATENT OFFICE

NORMAN B. BRALY, OF REDWOOD CITY, CALIFORNIA

HOSE COUPLING

Application filed June 11, 1930. Serial No. 460,433.

The present invention relates to improvements in hose couplings of the type set forth in prior Letters Patent of the United States granted to me on July 22, 1919, No. 1,310,559, to-wit, couplings of that type in which the hose is of flexible material, such as canvas, and is utilized particularly for mine ventilation and purposes of a generally analogous character.

The object of the present invention is to provide improved means for holding the body of the hose section to the coupling member and to provide in this connection novel means for limiting the expansion of the coupling member, so that certain elements perform double functions.

In the accompanying drawings:

Figure 4 is a detail plan view of one of the coupling members with a portion broken away to show the rod end connections.

Figure 5 is a detail sectional view on the line 5—5 of Figure 4.

Figure 6 is a detail perspective view of one of the holding rings.

Figure 7 is a detail sectional view showing the sliding connection between the ends of such ring.

Figure 8 is a detail perspective view illustrating the end parts separated.

Figure 9 is a detail modified form of construction of the end connections of the holding ring.

Figure 10 is a detail perspective sectional view through one of the coupling members.

In the structure disclosed, the end portions 11 of hose sections are illustrated. These are of flexible material, such as canvas, and it will be understood are of relatively large diameter, particularly where employed for mine ventilation. The ends of the sections have secured to them the novel coupling members, and as in the present embodiment these members are duplicates, a description of one will suffice for both.

Figures 2, 3:
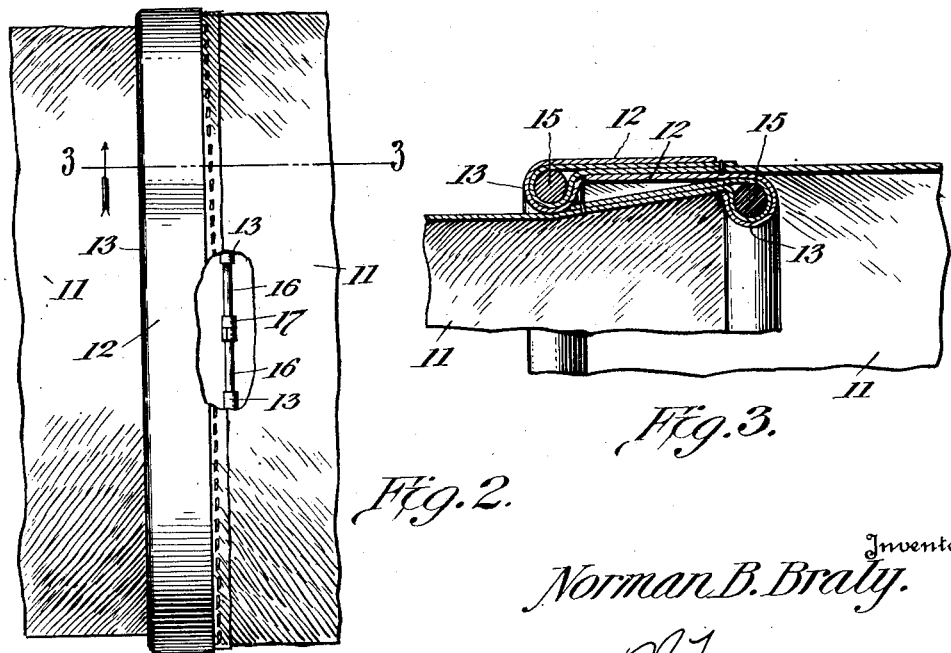
Figure 2 is a side elevation of the coupling in properly assembled operative condition.
Figure 3 is a detail sectional view on the line 3—3 of Figure 2.

A metal collar 12 surrounds the end of the hose section, and is provided at its outer end with an inturned bead 13. This collar is split and the ends 14 are preferably separated, as shown more particularly in Figure 4. Enclosed by the bead 13 is a holding element in the form of a rod ring 15. The ends 16 of this rod ring project into the space between the ends of the collar 14 (again see Figure 4), where they are overlapped. Each has an offset eye 17 through which the other slidably passes, and these eyes are adapted to abut so as to limit the expansion of the coupling member. They, however, permit the contraction of said member, as will be evident. The rod ring 15 not only serves as an expansion-limiting element, and as a stiffener for the bead 13, but it also cooperates with the walls of the bead in securing the end of the hose section to the coupling, for as shown in Figure 3, the fabric surrounds the rod 15 and is clamped by and between it and the walls of the bead. This fabric, it will be evident by reference to Figure 6, extends across the joint between the ends 14 of the collar 12 and therefore encloses the slidably inter-engaged ends 16 of the rod, so that the walls of the structure are continuous at the end of the hose section.

Figure 1:
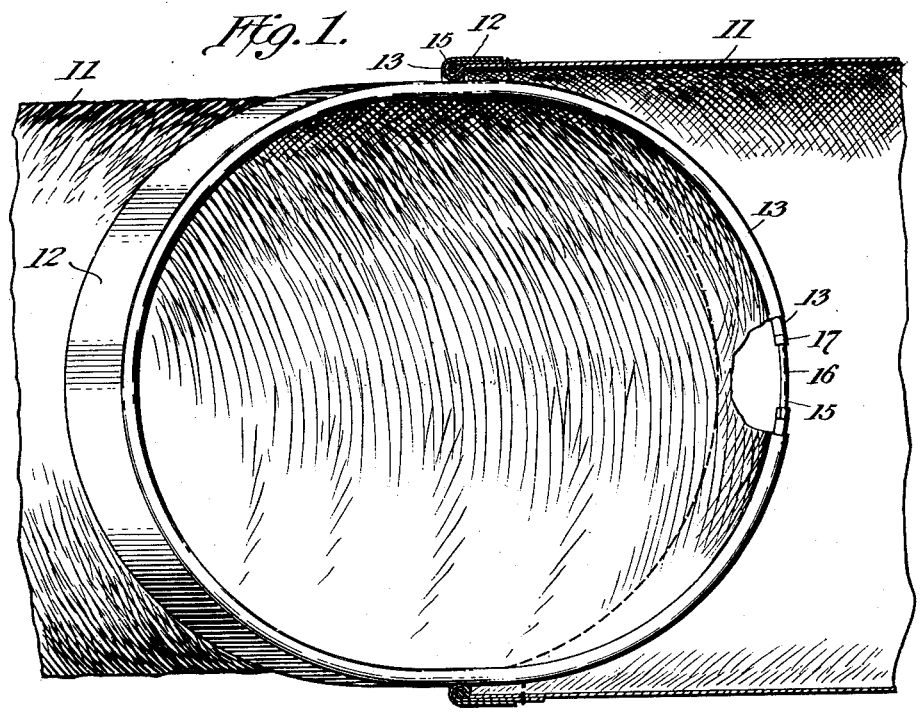
Figure 1 is a view partially in elevation and partially in section illustrating two hose sections partly coupled together.

In assembling the parts, one coupling member is preferably located at right angles to the other as shown in Figure 1, and is contracted so that it will pass through the said other and enter the hose section to which the latter is attached. The coupling members are then brought to a parallel relation and the inserted member drawn outwardly until it assumes the position shown in Figures 2 and 3. It will now be noted that the inner collar 12 abuts the bead 13 which constitutes a stop that prevents the members separating, it being understood of course that the inner member has expanded to the limit permitted by the outer surrounding collar 12.

An exceptionally effective coupling is thus provided that is simple in structure and in which the parts perform a plurality of functions. Thus the rod 15 serves not only as a device for limiting the expansion of the coupling, but it acts as a holder for the fabric and as a stiffener for the bead against which the inner member abuts when the members are in assembled relation.

Various modifications may be made. Thus in Figure 9, instead of separate eye elements, as 17 fixed to the end of the rod, said ends may be bent as shown at 17a into offset eyes, each receiving the other end portion.

What I claim, is:

1. A tube coupling of the character set forth, comprising detachably cooperating relatively expansible and contractile rings, one adapted to pass through the other, at least one of said rings comprising a collar member having a bead, a holding member within the bead, and a fabric tube section having its end around the holding member and clamped by and between it and the body member.

2. A tube coupling of the character set forth, comprising detachably cooperating relatively expansible and contractile rings, one adapted to pass through the other, at least one of said rings comprising a collar member having a bead, a holding member within the bead, and a fabric tube section having its end around the holding member and clamped by and between it and the collar member, said bead being inturned and forming an abutment against which the coacting ring bears when the rings are in cooperative relation.

3. A tube coupling of the character set forth, comprising detachably cooperating relatively expansible and contractile rings, one adapted to pass through the other, at least one of said rings comprising a split collar having an inturned tubular bead forming an abutment for the other coacting ring when the rings are in assembled relation, a holding rod within the bead, and a tube section having its end wrapped about the holding rod and clamped by and between it and the walls of the bead.

4. A coupling member of the character set forth comprising a split collar, and a holding device mounted on the collar and having its ends slidably interlocked, said interlocked ends bridging the collar joint and limit its spreading or expansible movement.

5. A coupling member of the character set forth, comprising a split collar, and a holding ring element mounted in the collar and having its ends slidably interlocked at the joint of the collar to limit the spreading or expansion of the coupling member.

6. A coupling member of the character set forth, comprising a split collar having a longitudinal bead, and a holding rod enclosed by the bead and having ends extended into the collar joint and slidably interlocked.

7. A coupling member of the character set forth, comprising a split collar having a longitudinal inset stop bead for abutment by a coacting coupling member, said collar having its ends spaced apart, and a holding rod enclosed by the bead and having ends extended into the space between the ends of the collar, said ends being slidably interlocked and limiting the expansion of the coupling member.

8. A coupling member of the character set forth, comprising a split collar having a longitudinal inset stop bead for abutment by a coacting coupling member, said collar having its ends spaced apart, a holding rod enclosed by the bead and having ends extended into the space between the ends of the collar, said ends being slidably interlocked and limiting the expansion of the coupling member, and a flexible tubular section having its end wrapped about the rod and clamped by and between it and the walls of the collar's bead.

9. In combination flexible tube sections, and means carried by the ends of said sections for coupling them together, said means each comprising a metal split collar that lies lengthwise of the tubular section and has its outer end an inturned bead forming an abutment stop for the coacting collar of the other section, and a rod located longitudinally in the bead, and having slidably interengaged ends at the joint of the collar, the end of the tube section being wrapped about the rod and engaged in the bead and said slidably engaged rod ends limiting the expansion of the collar, one collar being adapted to pass through the other and lie within it against the bead thereof.

In testimony whereof, I affix my signature.

NORMAN B. BRALY.